June 9, 1925.                                                      1,540,818
H. L. TAYLOR
APPLE AND OTHER FRUIT PICKER
Filed Nov. 28, 1923
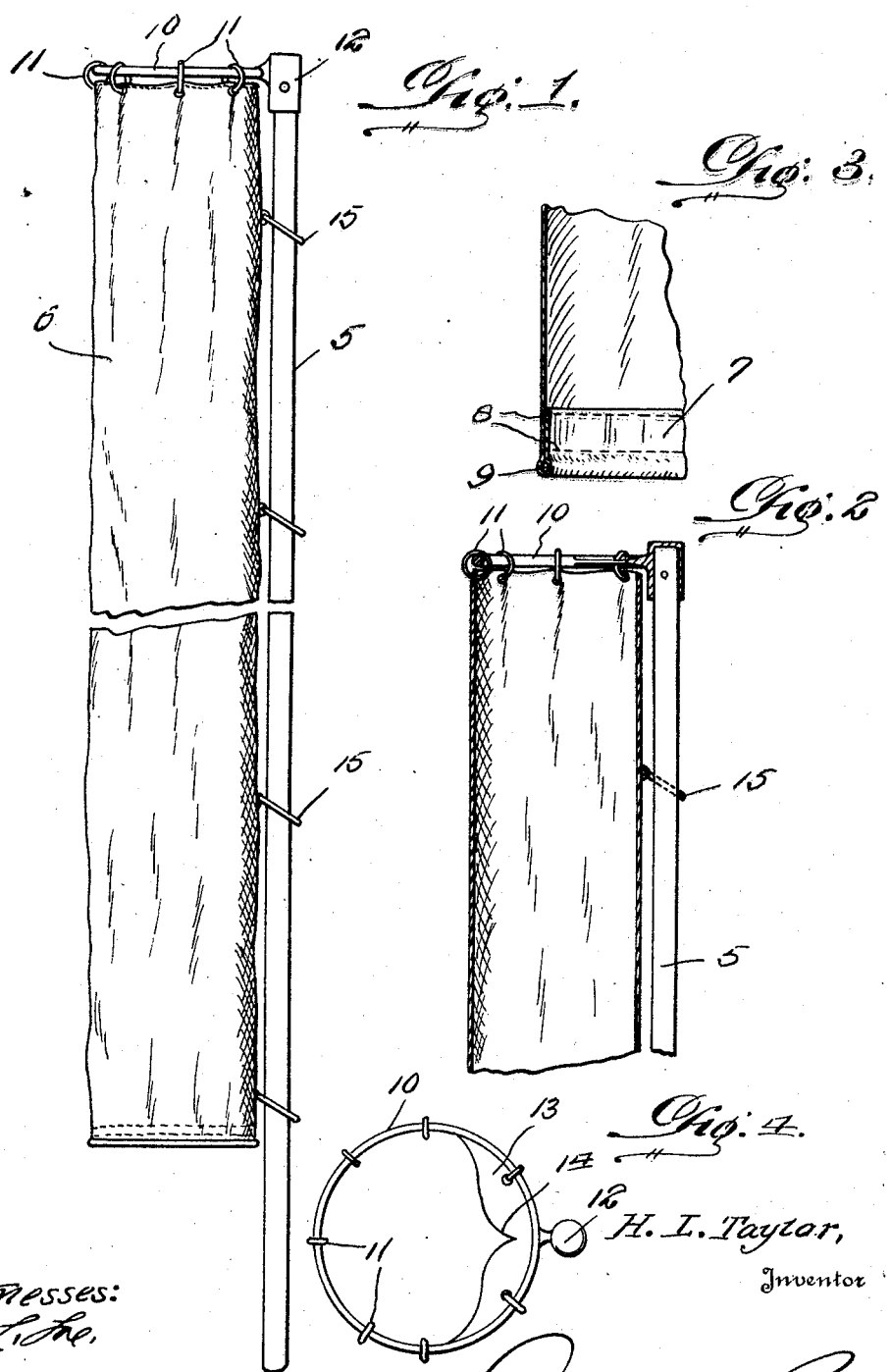

Patented June 9, 1925.

1,540,818

UNITED STATES PATENT OFFICE.

HENRY L. TAYLOR, OF WESTFIELD, WISCONSIN.

APPLE AND OTHER FRUIT PICKER.

Application filed November 28, 1923. Serial No. 677,441.

*To all whom it may concern:*

Be it known that I, HENRY L. TAYLOR, a citizen of the United States, residing at Westfield, in the county of Marquette and State of Wisconsin, have invented certain new and useful Improvements in Apple and Other Fruit Pickers, of which the following is a specification.

In carrying out the present invention it is my purpose to provide a highly novel and simplified form of fruit picker wherein fruit may be readily picked from the tree without the usual necessity of climbing up into the tree or standing upon a ladder or other suitable support and pulling the fruit from the tree by hand.

The primary object of the present invention is to provide an article of the above character that is a substantial improvement over other devices now in use.

With the above and other objects in view as the nature of the invention will be better understood, the same comprises the novel form, combination and arrangement of parts hereinafter more fully described, shown in the accompanying drawing and claimed.

In the drawing wherein there is shown the most practical embodiment of the invention with which I am at this time familiar, and wherein like reference characters indicate corresponding parts throughout the different views, Figure 1 is a side elevational view, partly broken away, of a fruit picker constructed in accordance with the present invention, Figure 2 is a detailed fragmentary sectional view of the picker for more clearly disclosing the construction of the upper end thereof, Figure 3 is a fragmentary cross section taken through the lower end of the fruit conveying tubular element, and Figure 4 is a top plan view of my improved picker.

Now having particular reference to the drawing wherein there is shown a fruit picker constructed in accordance with the present invention, the same embodies a pole 5 of relatively great length and with which is to be detachably associated a fruit conveying tubular element 6 preferably of fabric and being open at its opposite ends.

This fruit conveying tubular element is of a length almost as great as the length of the pole 5 and is preferably reinforced at its lower open end by turning in the material comprising the tube as indicated by the reference character 7 in Figure 3 and then stitching this inturned portion to the tube proper by rows of stitches 8. At the connecting point between this inturned portion 7 and the tube proper, a wire ring 9 may be and preferably is inserted for further reinforcing this lower end of said tubular conveying member.

The upper end of this tubular fruit conveying element is connected to a wire ring 10 through the medium of suitable fasteners 11 which preferably consist of small metal tongs as shown in Figures 1, 2 and 4. The ring member 10 to which the upper end of the conveying tube 6 is secured is formed with a metal cap member 12 that is adapted to be positioned over and secured to the upper end of the before mentioned pole 5.

Adjacent this cap 12 said ring 10 is also formed with an inwardly extending solid metal portion 13 that is formed intermediate its ends with a V-notch 14 within which the stems of the fruit are to be engaged whereby slight forward movement of the picker will manifestly snap the fruit from the branches and allow the same to drop into the conveying tube 6 and consequently out through the lower end thereof into the hand of the person using the fruit picker, without bruising or injuring the fruit.

For maintaining the tubular fabric conveyer 6 in close relationship with the pole 5, the same is provided upon its back side with a sufficient number of metal rings 15 that engage loosely over said pole in a manner clearly shown in Figure 1.

In view of the above, it will at once be apparent that I have provided a highly novel and simplified form of fruit picker and one wherein the fruit may be advantageously picked from the trees without, as before mentioned, the usual necessity of the pickers climbing up into the trees and pulling the fruit directly therefrom by hand.

Although I have herein shown and described the most practical embodiment of the invention with which I am at this time familiar, it is nevertheless to be understood that minor changes may be made in the invention without departing from the spirit and scope of the appended claim.

Having thus described my invention, what I claim as new and desire to secure by Letters Patent is:—

A fruit picker including a circular ring having a cap integral with a portion thereof and disposed beyond the outer periphery of the ring, said cap having a socket the axis of which is disposed at a right angle to the plane of the ring, a blade fixed within the ring adjacent the cap, annular fasteners loosely receiving the ring, some of said fasteners passing transversely through the blade, a tube connected with the fasteners, and a pole having its end received in the socket of the cap and extending along the tube, and means attached to the tube and surrounding the pole.

In testimony whereof I affix my signature.

HENRY L. TAYLOR.